US008428909B2

(12) United States Patent  
Collins

(10) Patent No.: US 8,428,909 B2
(45) Date of Patent: Apr. 23, 2013

(54) USE OF STATISTICS TO DETERMINE CALIBRATION OF INSTRUMENTS

(75) Inventor: Daniel J. Collins, Maple Glen, PA (US)

(73) Assignee: Siemens Industry, Inc., Alpharetta, GA (US)

( * ) Notice: Subject to any disclaimer, the term of this patent is extended or adjusted under 35 U.S.C. 154(b) by 811 days.

(21) Appl. No.: 12/233,985

(22) Filed: Sep. 19, 2008

(65) Prior Publication Data

US 2009/0082987 A1 Mar. 26, 2009

Related U.S. Application Data

(60) Provisional application No. 60/973,892, filed on Sep. 20, 2007, provisional application No. 60/974,149, filed on Sep. 21, 2007, provisional application No. 60/974,133, filed on Sep. 21, 2007, provisional application No. 60/974,142, filed on Sep. 21, 2007.

(51) Int. Cl.
*G01D 18/00* (2006.01)

(52) U.S. Cl.
USPC .......................................... 702/185; 702/179

(58) Field of Classification Search ............. 702/85
See application file for complete search history.

(56) References Cited

U.S. PATENT DOCUMENTS

| | | | | |
|---|---|---|---|---|
| 5,586,066 A | * | 12/1996 | White et al. | 702/181 |
| 5,838,561 A | * | 11/1998 | Owen | 700/32 |
| 6,804,618 B2 | * | 10/2004 | Junk | 702/77 |
| 7,653,456 B2 | * | 1/2010 | Kubota et al. | 700/177 |
| 7,752,012 B2 | * | 7/2010 | Kavaklioglu | 702/179 |
| 2008/0270162 A1 | * | 10/2008 | Machacek | 705/1 |

FOREIGN PATENT DOCUMENTS

| | | |
|---|---|---|
| DE | 4022954 | 1/1992 |
| DE | 19506388 C1 | 8/1996 |
| DE | 10242128 A1 | 3/2004 |
| DE | 102004044335 A1 | 4/2006 |
| EP | 1206732 B1 | 4/2010 |
| WO | WO 9803879 | 1/1998 |

OTHER PUBLICATIONS

Winings, Jim, Statistical Process Control Overview, http://www.sixsigmapc.com/spc/statistical_process_control.html, Last updated Jun. 9, 2006.*
Control Chart—ASQ, http://asq.org/learn-about-quality/data-collection-analysis-tools/overview/control-chart-html, 2004.*
Bersimis et al., Multivariate Statistical Process Control Charts: An Overview, Qual. Reliab. Engng. Int. 2007; 23: 517-543, Published Online Nov. 7, 2006.*

(Continued)

*Primary Examiner* — Jonathan C Teixeira Moffat
*Assistant Examiner* — Timothy H Hwang

(57) ABSTRACT

The present invention relates generally to statistics and calibration of instruments. More particularly, the invention encompasses the use of statistics to determine calibration of instruments. The present invention is also directed to a remote system for determination of re-calibration of instruments. The present invention also teaches the use of multiple statistical tests to determine need for calibration. The invention also includes a novel use of tests, such as, the F-Test, the Z-Test, to determine need for calibration. Furthermore, this invention relates to an alternate instrument scheme consisting of the use of redundant sensors and statistical analysis to avoid unnecessary calibrations and to detect sensors that are starting to drift before they go out of calibration. With this invention reduced calibration cost, increased data integrity, and reduced off-spec uncertainty is achieved.

24 Claims, 10 Drawing Sheets

OTHER PUBLICATIONS

Comparison of Standard Deviations (F-Test), MedCalc, http://www.medcalc.org/manual/comparison_of_standard_deviations_f-test.php (last accessed Apr. 20, 2012).*

Covariance Description, IBM, http://publib.boulder.ibm.com/infocenter/radhelp/v7r5/index.jsp?topic=%2Fcom.businessobjects.integration.eclipse.designer.doc%2Fhtml%2Ftopic542.html (last accessed Apr. 20, 2012).*

Definition of "Standard Deviation", thefreedictionary.com, http://www.thefreedictionary.com/p/standard%deviation, last accessed (Aug. 28, 2012).*

\* cited by examiner

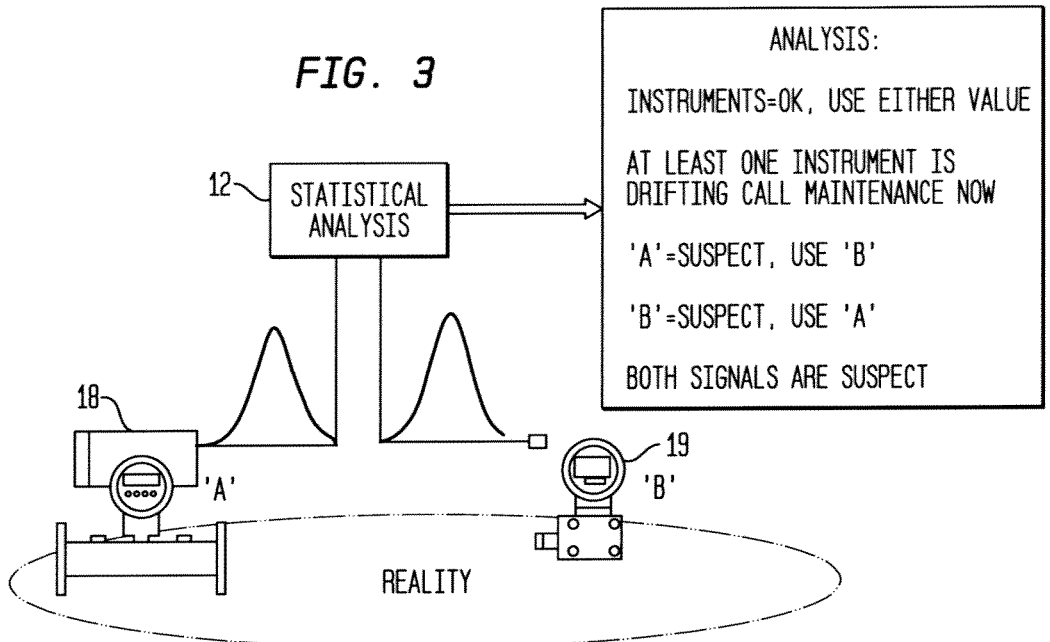
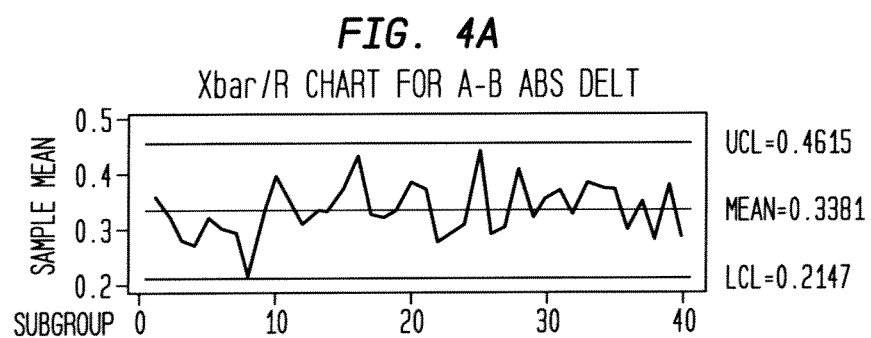
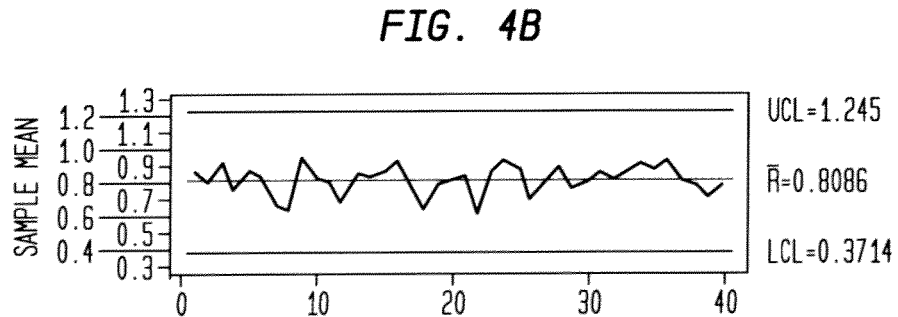

FIG. 9A
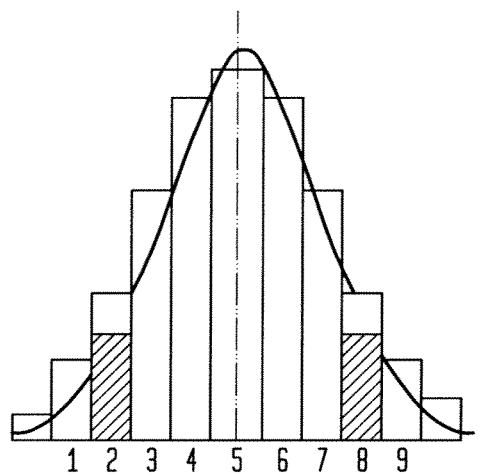
FIG. 9B
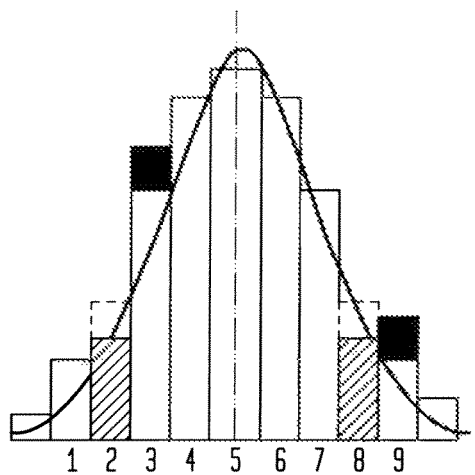
FIG. 10
| SAMPLES | START | MOVING |
|---|---|---|
|  | 2 | 2 |
|  | 2 | 2 |
|  | 2 | 3 |
|  | 8 | 8 |
|  | 8 | 8 |
|  | 8 | 9 |
| MEAN | 5.00 | 5.33 |
| STANDARD DEVIATION | 3.29 | 3.33 |

USE OF STATISTICS TO DETERMINE CALIBRATION OF INSTRUMENTS

CROSS-REFERENCE TO RELATED APPLICATIONS

The instant patent application is related to U.S. Provisional Patent Application Ser. No. 60/973,892, filed on Sep. 20, 2007, titled "Use Of Statistics To Determine Calibration Of Instruments," U.S. Provisional Patent Application Ser. No. 60/974,149, filed on Sep. 21, 2007, titled "Remote System For Determination Of Re-Calibration Of Instruments," U.S. Provisional Patent Application Ser. No. 60/974,133, filed on Sep. 21, 2007, titled "Use Of Multiple Statistical Tests To Determine Need For Calibration," and, U.S. Provisional Patent Application Ser. No. 60/974,142, filed on Sep. 21, 2007, titled "Use Of Z-Test To Determine Need For Calibration," the entire disclosure of each is incorporated herein by reference.

FIELD OF THE INVENTION

The present invention relates generally to statistics and calibration of instruments. More particularly, the invention encompasses the use of statistics to determine calibration of instruments. The present invention is also directed to a remote system for determination of re-calibration of instruments. The present invention also teaches the use of multiple statistical tests to determine need for calibration. The invention also includes a novel use of tests, such as, the F-Test, the Z-Test, to determine need for calibration. Furthermore, this invention relates to an alternate instrument scheme consisting of the use of redundant sensors and statistical analysis to avoid unnecessary calibrations and to detect sensors that are starting to drift before they go out of calibration. With this invention reduced calibration cost, increased data integrity, and reduced off-spec uncertainty is achieved.

BACKGROUND INFORMATION

There is a market need, such as, one dictated by the Federal Drug Administration (FDA), to maintain the accuracy of sensors that are defined as current Good Manufacturing Practices (cGMP) values in a validated pharmaceutical process. Today, this is achieved by various methods, such as, (1) installing 'certified' instruments, and (2) maintaining a costly routine calibration protocol.

Additionally, the Food and Drug Administration's Process Analytical Technology (PAT) initiative has opened the door to a fresh look at applying technology for productivity improvements, especially, in the pharmaceutical industry. The application of on-line, real time analytical instruments was the first PAT initiative. This invention addresses another problem—data integrity. This invention takes a novel approach to maintaining data integrity through the use of redundancy and statistical analysis. The result is reduced calibration cost, increased data integrity and reduced off-spec uncertainty.

Today, pharmaceutical companies write elaborate calibration protocols that are consistent (and sometimes overly compliant) with FDA cGMP guidelines to maintain the reported process value integrity. This can result is extremely high cost for compliance with only a minimum ROI for improved productivity or product quality. For example, one pharmaceutical site in New Jersey conducts about 2900 calibrations per month. Of those, about 500 are demand maintenance where the instrument has clearly failed as evidence by a lack of signal or a digital diagnostic (catastrophic failures). The remaining 2400 calibrations are scheduled per protocol. Of these, only about 400 calibrations find the instrument out of calibration. The majority, about 2000, calibrations per month find the instrument still working properly.

With this invention an alternate instrument scheme is provided which basically consists of the use of redundant sensors and statistical analysis to avoid unnecessary calibrations and to detect sensors that are starting to drift before they go out of calibration.

Additionally, there is also a need for a manufacturing process which utilizes calibration and monitoring instruments to reduce the cost and complexity.

This invention overcomes the problems of the prior art and provides an inventive use of statistics to determine calibration of instruments.

PURPOSES AND SUMMARY OF THE INVENTION

The invention is a novel use of statistics to determine calibration of instruments.

Therefore, one purpose of this invention is to provide a novel use of statistics to determine, in real time, the need for physical calibration of instruments.

Another purpose of this invention is to provide a remote system for determination of re-calibration of instruments.

Yet another purpose of this invention is to provide a use of multiple statistical tests to determine need for calibration.

Still yet another purpose of this invention is to provide a use of test, such as, the F-Test, the T-Test, the T-Paired Test, the Z-test, to determine need for calibration.

Therefore, in one aspect this invention comprises a method of using statistics to determine calibration of instruments, comprising:

(a) installing at least one first sensing instrument to sense at least one critical value in a process flow;

(b) installing at least one second sensing instrument to sense at least one critical value in a process flow;

(c) tracking relative consistency of data obtained from said first sensing instrument and said second sensing instrument; and (d) upon detection from data from said first sensing instrument and said second instrument that the two values are drifting apart, determining which instrument is drifting as a function of the relative change in the individual instruments change in standard deviation.

In another aspect this invention comprises a method of using statistics to determine calibration of instruments, comprising:

(a) installing at least one first sensing instrument to sense at least one critical value in a process flow;

(b) installing at least one second sensing instrument to sense at least one critical value in a process flow;

(c) obtaining at least one first tracking information from said first sensing instrument, and obtaining at least one second tracking information from said second sensing instrument;

(d) sending said first tracking information and said second tracking information to at least one computer;

(e) tracking in said computer relative consistency of data obtained from said first sensing instrument and said second sensing instrument; and (f) upon detection from data from said first sensing instrument and said second instrument that the two values are drifting apart, determining which instrument is drifting as a function of the relative change in the individual instruments change in standard deviation.

In yet another aspect this invention comprises a program storage device readable by machine, tangibly embodying a program of instructions executable by the machine to perform method steps for using statistics to determine calibration of instruments, the method steps comprising:
(a) installing at least one first sensing instrument to sense at least one critical value in a process flow;
(b) installing at least one second sensing instrument to sense at least one critical value in a process flow;
(c) tracking relative consistency of data obtained from said first sensing instrument and said second sensing instrument; and
(d) upon detection from data from said first sensing instrument and said second instrument that the two values are drifting apart, determining which instrument is drifting as a function of the relative change in the individual instruments change in standard deviation.

In still yet another aspect this invention comprises a program storage device readable by machine, tangibly embodying a program of instructions executable by the machine to perform method steps for using statistics to determine calibration of instruments, the method steps comprising:
(a) installing at least one first sensing instrument to sense at least one critical value in a process flow;
(b) installing at least one second sensing instrument to sense at least one critical value in a process flow;
(c) obtaining at least one first tracking information from said first sensing instrument, and obtaining at least one second tracking information from said second sensing instrument;
(d) sending said first tracking information and said second tracking information to at least one computer;
(e) tracking in said computer relative consistency of data obtained from said first sensing instrument and said second sensing instrument; and
(f) upon detection from data from said first sensing instrument and said second instrument that the two values are drifting apart, determining which instrument is drifting as a function of the relative change in the individual instruments change in standard deviation.

BRIEF DESCRIPTION OF THE DRAWINGS

The features of the invention that are novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

FIG. 3 illustrates statistical analysis results of a two instrument system.

FIG. 4A illustrates a statistical sample mean control chart of the delta between pairs of Sensor 'A' and Sensor 'B' simultaneous readings.

FIG. 4B illustrates a statistical sample range control chart of the delta between pairs of Sensor 'A' and Sensor 'B' simultaneous readings.

FIG. 9A, illustrates a first shifting mean which is seen with the change in variance.

FIG. 9B, illustrates a second shifting mean which is seen with the change in variance.

FIG. 10, illustrates a shift in variance.

DETAILED DESCRIPTION

One way to practice this invention is to:
(a) to install at least two dissimilar sensors or instruments to sense the critical value,
(b) to track their relative consistency via a statistical control chart,
(c) upon detection that the two values are drifting apart, to determine which instrument is drifting as a function of the relative change in the individual instruments change in standard deviation,
(d) to use the process alarm management system to alarm the operator that
  (d1) the sensors are drifting statistically apart,
  (d2) the most likely had instrument is the one with the changing standard deviation.

Furthermore, if in the process there are no alarms from the two instruments or sensors, then
(a) both instruments are tracking,
(b) the operator and control programs can assume there is high data integrity,
(c) there is no need for routine calibration.

Figure 1:
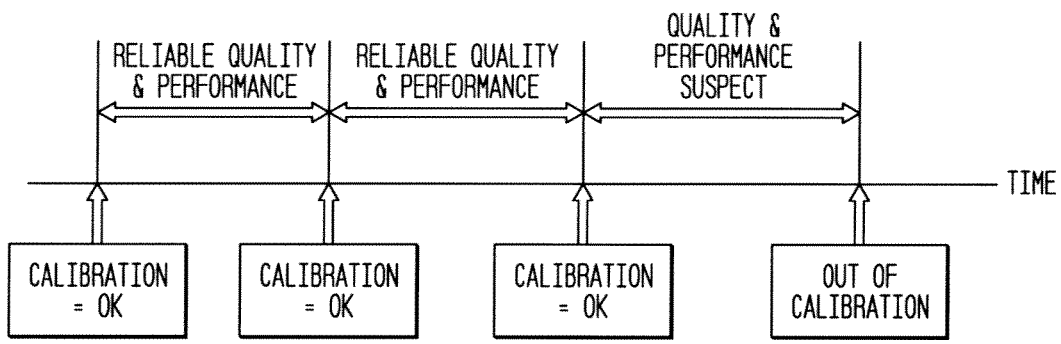
FIG. 1 illustrates a need and hidden cost to evaluate all product and performance that may have been effected by the undetected failure of a cGMP instrument.

FIG. 1, illustrates a need and hidden cost to evaluate all product and performance that may have been effected by the undetected failure of a cGMP instrument.

With this invention one can have both "hard savings" and "soft savings." "Hard savings" can be achieved by comparing the cost of the second instrument versus the need for periodic calibrations. "Soft savings" can be achieved with the cost of auditing product quality for everything that was affected by the failed instrument since its last calibration.

A base level of understanding of instrumentation calibration is important, because precise, dependable process values are vital to an optimum control scheme, and, in some cases, they are mandated by compliance regulation. Precision of the instrument calibration starts with the selection and installation of the analog sensor, while the integrity of the reported process value is maintained by routine calibration throughout the life of the instrument.

For example, when one specifies a general purpose instrument, it has a stated accuracy, for example, +/−1% of actual reading. In the fine print, that means that the vendor states that the reading of the instrument will be within 1% of reality 95% of the time (certainty).

Figure 2:
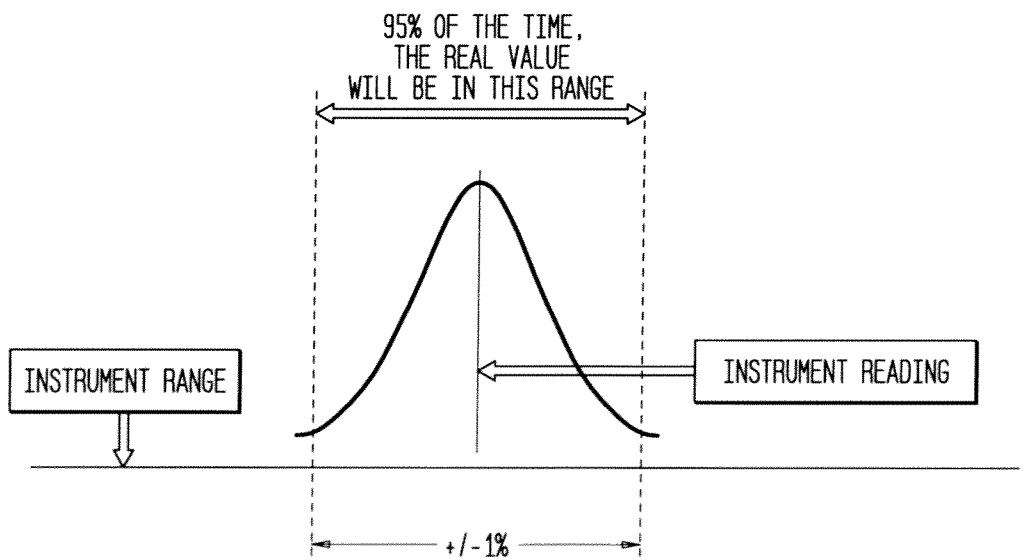
FIG. 2 is an illustration of an accuracy of an instrument.

Another way to look at this is for example, if the instrument, such as, a speedometer, as illustrated in FIG. 2, which is an illustration of an accuracy of an instrument, indicates that one is traveling at 55 MPH and the automobile manufacturer installed a +/−1% speedometer, then one really does not know exactly how fast one is going but there is a 95% probability that it is somewhere between 54.45 and 55.55 MPH, as illustrated in FIG. 2.

However, if one needs to improve the accuracy of the values, one can specify:
(a) a very accurate device, i.e., tighter tolerances, for example, 1.0% to 0.1%, and/or
(b) a higher quality device, for example, higher manufacturing standards, for example, 95% to 99% certainty, and/or
(c) wet calibration, i.e., to "certify" the calibration of the actual device meets die manufacturing standards.

Furthermore, once installed, periodical re-calibration of the instrument based on drift specification provided by the instrument vendor, owner/operator philosophy (paranoia), or industry guideline GMP also assures the integrity of the value obtained from the instrument.

Additionally, there are two reasons where one would accept the situation where 5% of the time, the instrument is probably reporting a value that is more than 1% inaccurate. The first would be a cost/value tradeoff, i.e., it simply is not worth it, and the inaccuracy will not effect production or quality. The second would be that the next reading has a 95% chance of being +/−1% of reality so one is back within the specifications.

High frequency, periodic calibration is the conventional solution to this dilemma. However, for example, these 2400 scheduled calibrations, as discussed earlier, present two economic hardships. The first is that the 2000 calibrations that simply verify the instruments are still operating within specifications are pure non-ROI cost. And, the second is that the 400 that are out of "specification" create an even more troublesome problem. For example, if the instrument's process value is critical enough to be a validated instrument that requires periodic calibration, then what do you do when it is discovered the instrument to be out of calibration.

Additionally, by protocol, does one also have to review all products that have been manufactured since the last known good calibration? Probably, 'yes,' because if the answer is 'no,' then why was this instrument considered a validated instrument? However, if the instrument is only a little bit out of calibration, but still within the product/process requirements, then the review can be trivial. But, if it is seriously out of calibration, then a comprehensive quality audit or product recall may be mandated by protocol.

One also needs to make a distinction between 'availability' and 'integrity.' If the value is so critical that the process can not do without it, then conventional wisdom suggests the installation of two instruments for increased availability. However, the primary flaw in conventional wisdom is that a second instrument only increases availability and minimizes the probability of a catastrophic failure, i.e., "if one breaks, use the other value." The addition of a second instrument does not improve the integrity of a signal.

One can classify instrument failures into two categories, (a) catastrophic, and (b) integrity. A catastrophic failure is one in which the instrument does not perform at all, while an integrity failure is one in which the instrument does not perform correctly. A catastrophic instrument failure is easy to detect, for example, a major breakdown, because there is no signal coming from the instrument. The impact of a catastrophic failure is minimized by a redundant instrument configuration.

However, an instrument integrity failure is more esoteric because one is receiving a signal but it is not accurate and insidious because there is no inherent way to recognize that the reported value is inaccurate. Unlike most man made devices an instrument may not show symptoms of degradation before it fails completely. For example, an automobile will run rough or make a noise before it breaks down. A degrading instrument will provide a value and one has no inherent way to recognize that it has drifted out of specifications. It will appear to be operating properly, as there is no equivalent perception of running rough.

Therefore, the use of redundant instruments does not address sensor drift. In fact, they expose the issue of data integrity. For example, what does one do if the two instruments are not communicating the same value? How far apart can the values be before remedial action is initiated? Does one trust one instrument and not the other while the remedial action is being performed? Which signal can be trusted?

We can now examine some of the subtle differences between availability and integrity. Availability calculates the simple probability that the system is operational. It does not address the quality or performance. Integrity is a measure of performance.

For example, for sensors, the issue is data integrity, but what does one do when the two values differ?

If the values coming from the two instruments are close enough, then one can use either value. "A" or "B", or both, "(A+B)/2." But, the question is what is "close enough?" Some prefer a very liberal tolerance, such as, the sum of their stated accuracies of the two instruments i.e. 1%+1%=2%. Most prefer their root mean, that is, square root of (1%+1%)=1.4%.

What if the value coming from the two instruments are too far apart? Does one use "A" or "B" or (A+B)/2 anyway, or use the last value or use the lower value or use the higher value or stop everything and call maintenance?

However, advancements in computer power and statistical analysis tools now makes it possible to address and solve the reliability problem.

One solution that is presented in this invention is, (a) to install two different types of instruments to measure the process variable, (b) analyze the signals from the two different types of instruments to verify that they are properly tracking each other, (c) an alarm is triggered and maintenance is initiated when they begin to drift apart, and (d) identify which one is the suspect failing instrument.

The use of dissimilar instruments reduces the possibility of common cause failures that may result if identical instruments were damaged by a process anomaly and happened to fail in a similar fashion.

This invention also provides a constant level of assurance that the process value has data integrity. Additionally, with this invention there will be constant verification that the two instruments are not drifting apart. Since they are dissimilar instruments, it is highly unlikely that they would go out of calibration at the same time, in the same direction and at the same rate as to avoid statistical recognition that they are drifting.

FIG. 3 illustrates statistical analysis results for at least one first sensor or instrument A 18, and for at least one second sensor or instrument B 19. For the ease of understanding the first sensor or instrument 18, preferably will be referred to as sensor "A," and the second sensor or instrument 19, will preferably be referred to as sensor "B." If the two signals from instrument or sensor "A" and instrument or sensor "B" begin to drift apart the statistical analyzer 12, will trigger an alarm. The analysis engine will then analyze the historical data and identify which signal is behaving differently. For the purposes of illustration here the assumption is that only one instrument will fail at a time. Therefore, analysis of historical data will determine which instrument's performance is changing.

However, if the signal from both instruments 18, 19, are changing then there has probably been a change in the process and the entire process needs to be examined. This vital and new insight that previous, single sensor topographies were unable to provide dramatically, increases (a) the overall integrity of the control system, (b) the quality of production, (c) the productivity of the metrology lab, and decreases (1) the mean time to repair (MTTR) failing sensors, and (2) the cost of remedial quality assurance reviews that are mandated when a critical (validated) sensor is discovered to have failed some time in the past.

With this invention one advantage is the fact that the statistical method will detect very slight shifts in the two instrument signals, long before an instrument violates a hard alarm limit, such as, the square root of the sum of the accuracies. This invention of real time calibrating and alarming on the slightest statistically significant deviation renders conventional periodic calibration practices obsolete. As stated earlier that with this invention one can reduce the cost of unnecessary periodic calibrations, and minimizes the impact on production and product quality caused by the discovery of a critical instrument out of calibration during a periodic calibration by declaring the calibration protocol to calibrate whenever (and only when) the statistical alarm indicates a deviation in values.

An example of this invention as illustrated in FIG. 3, will now be discussed using a series of alpha level tests. A 1000 sample test data using random numbers to simulate sensor noise and biasing the noise to simulate drift was created using Microsoft Excel. The data was then analyzed in a statistical tool, MiniTab.

Sensor 'A' values equal a random number (0 to 1.0) added to the base number 99.5. This simulates a field signal of 100 +/−0.5. i.e., a sensor reading of 100 +/−0.5%. The random number simulates the noise or uncertainty of an instrument that is designed to provide a value that is +/−0.5% accurate.

Sensor 'B' is identically structured but uses a different set of random numbers.

Results indicate that statistical control charts and F-test calculations identify drift and the suspect sensor much faster than conventional detection. Typically, in two sensor configurations, the alarm limit to recognize that two sensors are reading different values is set at the root mean square of the stated accuracies of the two instruments.

Preliminary research found that the statistical method is more sensitive. Drift can be detected in about ⅓ the movement thus giving operations and maintenance even more time to respond to the drifting instrument before it goes officially out-of-calibration and triggers other remedial actions that are dictated by protocol to assure product quality.

FIG. 4A illustrates a statistical sample mean control chart of the delta between pairs of Sensor 'A' and Sensor 'B' simultaneous readings. As one can see that no statistical alarms are detected.

FIG. 4B illustrates a statistical sample range control chart of the delta between pairs of Sensor 'A' and Sensor 'B' simultaneous readings. As one can see that no statistical alarms are detected.

As illustrated in FIG. 4A, the first test evaluates the comparison a sensor 'A' and sensor 'B'. The first control chart as illustrated in FIG. 4A, evaluates the absolute value of the differences between Sensor 'A' and Sensor 'B'. 1000 pairs of values in subgroup size=25. This simulates capturing pairs of sensor readings at some convenient period, for example, once a minute, an hour, a fortnight—and executing an Xbar control chart on the last 1000 readings.

As one can see from the control chart in FIG. 4A, one finds that the sensors are in statistical control. There are no alarms, as expected, because the simulated signal noise is the result of a random number generator and we have not yet injected any error/bias/instrument drift.

Figure 5A:
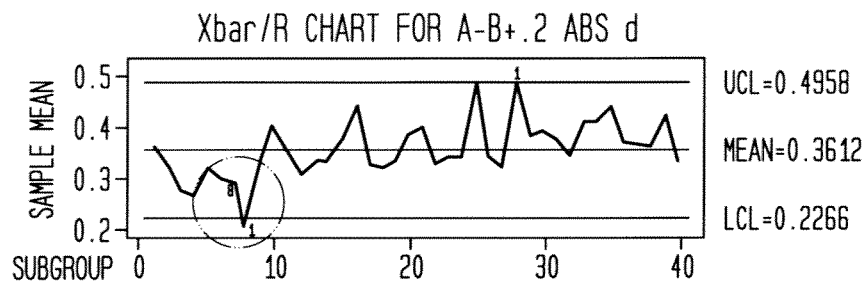
FIG. 5A, illustrates a statistical sample mean where alarms begin to show up when the simulated noise (randomness) in Sensor 'B' is amplified by 20%.

FIG. 5A, illustrates a statistical sample mean where alarms begin to show up when the simulated noise (randomness) in Sensor 'B' is amplified by 20%.

Figure 5B:
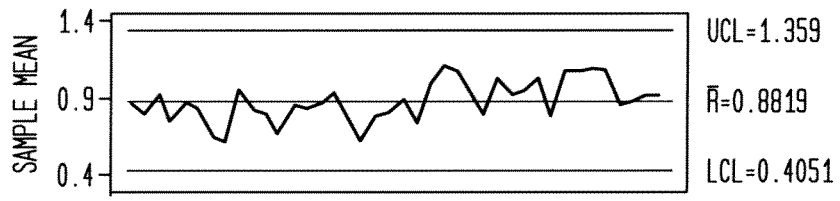
FIG. 5B, illustrates a statistical sample range where alarms begin to show up when the simulated noise (randomness) in Sensor 'B' is amplified by 20%.

FIG. 5B, illustrates a statistical sample range where alarms begin to show up when the simulated noise (randomness) in Sensor 'B' is amplified by 20%.

The second test, as illustrated in FIGS. 5A and 5B, evaluates the 1000 pairs of data with bias added to Sensor 'B'. Sensor 'B' oldest 500 values are identical to the first test as shown in FIGS. 4A and 4B. Sensor 'B's most recent 500 values have been altered by adding 20% of the random number to the sensor's value, i.e., sensor 'B' values for 1 to 500 are 99.5+random 'B'. Sensor 'B' values are from 501 to 1000 are 99.5+random 'B'+0.2*random 'B'. This simulates an instrument starting to become erratic.

As one can see in the second control chart, FIG. 5A, which shows the absolute value of the differences between Sensor 'A' and failing Sensor 'B' out of statistical control. One will notice that there are alarms, as expected, because the simulated signal noise has been slightly amplified to simulate that Sensor 'B' is becoming a little erratic and may be beginning to drift.

It should be appreciated that with conventional dual instrument configurations, the alarm limits are set at +/− root mean squared (RMS) of the sum of their stated accuracies (i.e., square root of (0.5% squared+0.5% squared)=0.707%). The mean difference is statically about half that at, in this data set, 0.338%, The Xbar/R Chart detected drift when the mean difference between the Sensor 'A' values and the Sensor 'B' values drifted by a mere 0.023%. In other words, the control chart, as shown in FIGS. 5A and 5B, detected a change in the comparable performance of the two sensors when the noise of one instrument grew by only 20%.

As one can see in FIGS. 5A and 5B, both instruments were still tracking one another and well within the conventional delta of 0.707%, while one of the instrument is starting to become erratic. This would be a time to calibrate Sensor 'B.' But, in the meantime the system has maintained its integrity.

Figure 6A:
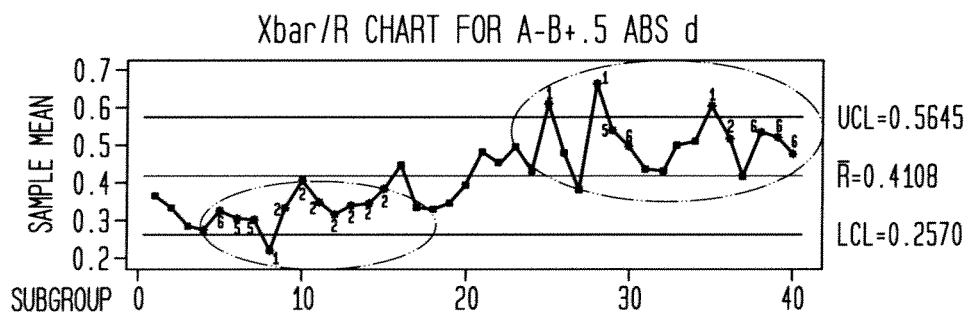
FIG. 6A, illustrates that statistical sample mean alarms were clearly present when the simulated noise (randomness) in Sensor 'B' was amplified by 50%.
Figure 6B:
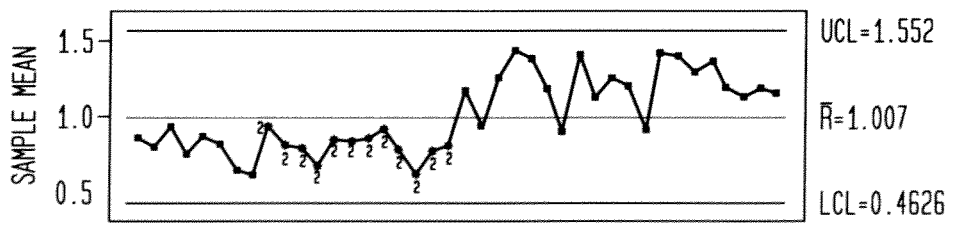
FIG. 6B, illustrates that statistical sample range alarms were clearly present when the simulated noise (randomness) in Sensor 'B' was amplified by 50%.

We can now repeat the lest by injecting an error equal to say 50%, i.e., we can let the random number that is simulating noise in Sensor 'B' have an increase of 50% in amplitude for the newest 500 instrument readings, as illustrated in FIGS. 6A and 6B.

FIG. 6A, illustrates that statistical sample mean alarms were clearly present when the simulated noise (randomness) in Sensor 'B' was amplified by 50%.

FIG. 6B, illustrates that statistical sample range alarms were clearly present when the simulated noise (randomness) in Sensor 'B' was amplified by 50%.

It should be appreciated that the mean value between the two instrument readings is still only 0.4108 but clearly the control chart has correctly detected an increase erratic behavior.

Figure 7A:
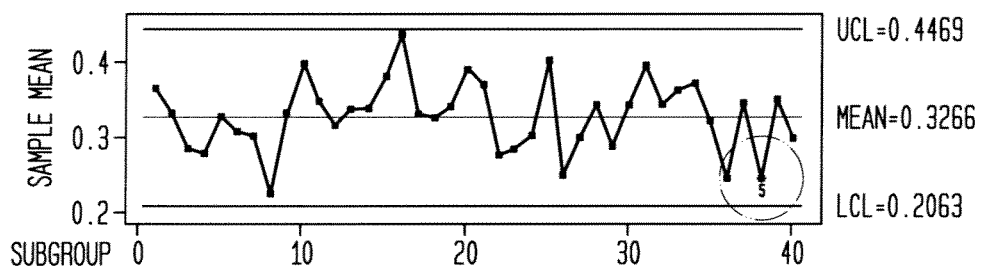
FIG. 7A, illustrates that a statistical sample mean alarm is clearly present when a drop in noise is simulated in Sensor 'B' by attenuating the random component by 20%.

FIG. 7A, illustrates that a statistical sample mean alarm is clearly present when a drop in noise is simulated in Sensor 'B' by attenuating the random component by 20%.

Figure 7B:
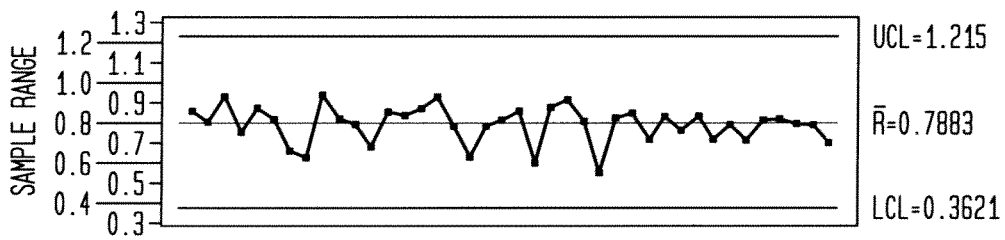
FIG. 7B, illustrates that a statistical sample range alarm is clearly present when a drop in noise is simulated in Sensor 'B' by attenuating the random component by 20%.

FIG. 7B, illustrates that a statistical sample range alarm is clearly present when a drop in noise is simulated in Sensor 'B' by attenuating the random component by 20%.

As one can see that the next control chart (FIGS. 7A and 7B) simulates an instrument starting to lose sensitivity. This could happen if the instruments has fouled, become sluggish or is about to go bad.

FIGS. 7A and 7B charts the absolute value of the differences between Sensor 'A' and the failing Sensor 'B'. Again, sensor 'B's oldest 500 values are identical to the first test as seen in FIGS. 5A and 5B. Sensor B's most recent 500 values have been altered by subtracting 20% of the random number to the sensor's value, i.e., sensor 'B' values for 1 to 500 are 99.5+random 'B.' and then sensor B's values for 501 to 1000 are 99.5+random 'B'−0.2 times random 'B'.

As can be clearly seen in FIGS. 7A and 7B, that a drop in the responsiveness (randomness) of the signals by a mere 20% can be detected. One can also notice that there is at least one alarm (as expected) because the simulated signal noise has diminished to simulate that Sensor 'B' is losing sensitivity, i.e., becoming flat lined.

Again, one should appreciate the sensitivity. The Xbar/R Chart, as shown in FIGS. 7A and 7B, detected drift when the mean difference between the Sensor 'A' values and the Sensor 'B' values close by a mere 0.012%. In other words, the control chart, FIGS. 7A and 7B, detected a change in the comparable performance of the two sensors when the noise of one instrument decreased by only 20%. Both instruments are still within calibration but one is beginning to lose its integrity.

Figure 8A:
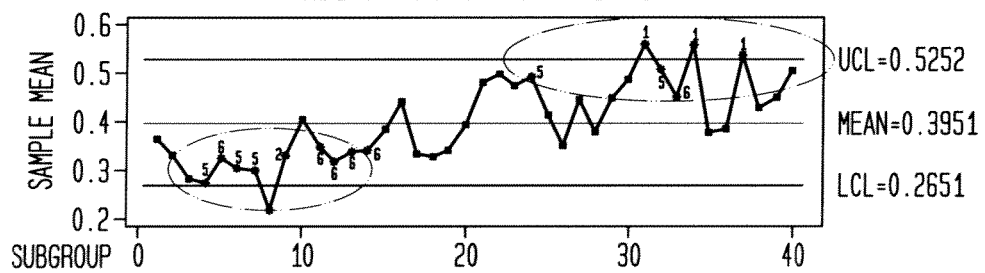
FIG. 8A, illustrates a sample mean when statistical alarms are extensively present when sensor 'B' loses sensitivity.

FIG. 8A, illustrates a sample mean when statistical alarms are extensively present when sensor 'B' loses sensitivity.

Figure 8B:
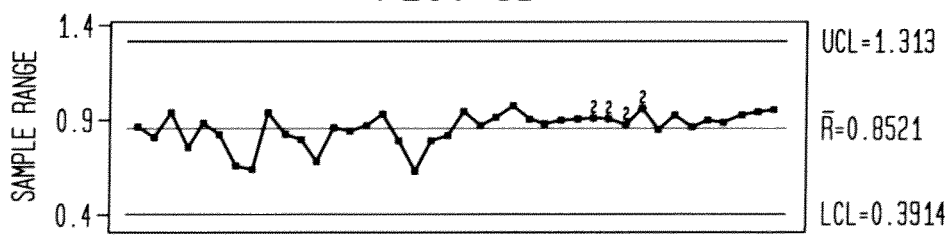
FIG. 8B, illustrates a sample range when statistical alarms are extensively present when sensor 'B' loses sensitivity.

FIG. 8B, illustrates a sample range when statistical alarms are extensively present when sensor 'B' loses sensitivity.

If one eliminates 90% of the noise from sensor 'B', i.e., simulating a non-responsive, flat line, dead instrument, one gets the results as illustrated in FIGS. 8A and 8B. Again, as one can see in FIGS. 8A and 8B, that the mean difference has not drifted too far apart but the statistical analysis has recognized the lack of responsiveness, and thus it is now time to calibrate the instrument "B."

As one can appreciate that with this invention sensor reliability and data integrity is assured as long as the pairs of sensors continue to pass the statistical analysis review. When they fail, an alarm generated by the real time control chart can be prosecuted through the process control alarm management system. Thus, as shown with this invention there is no need to perform periodic calibrations.

However, when statistical analysis detects an emerging problem, it is necessary to continue operations while the problem is remedied. Furthermore, statistical analysis can also be used to identify the most likely cause of the alarm. With this information, operations can continue, and the MTTR can be shortened.

FIG. 9A, illustrates a first shifting mean which is seen with the change in variance.

FIG. 9B, illustrates a second shifting mean which is seen with the change in variance.

As one can see in FIGS. 9A and 9B, that when a sample is shifted from one mean to another, the variance increases during the transition period. As seen in FIG. 9A, that two data, a '2' and an '8' shifted a mere one unit to the right to become a '3' and a '9,' as seen in FIG. 9B. The result is that the mean shift to the right, from 5.0 to 5.33, and the standard deviation also shifts up from 3.29 to 3.33. This is more clearly illustrated in FIG. 10, where FIG. 10, illustrates a shift in variance.

One can use this shift in variance, shown in FIG. 10, to detect a drift. The sample values from the two instruments will go up and down with changes in the real world value that is being sensed. Therefore, the actual mean value is of little consequence to the task of detecting instrument drift.

Again, one key factor is the variance. It should maintain statistical consistency over time. Both instruments means and standard derivations should track. When their means drift too far apart as detected by the control chart test, then one needs to look at the behavior of the standard deviation of each instrument to determine which instrument is behaving differently. The one that has a significant change in its variance (up or down) is suspect. If it has gained variance relative to its past, it is becoming unstable. If it has lost variance, it is becoming insensitive or may have fouled. In either case, the sensor that has a significant change in its variance over time, while the other sensor has not had a significant change, is suspect and is the probable 'specific cause' of the delta in means between the two sensors.

Figure 11:
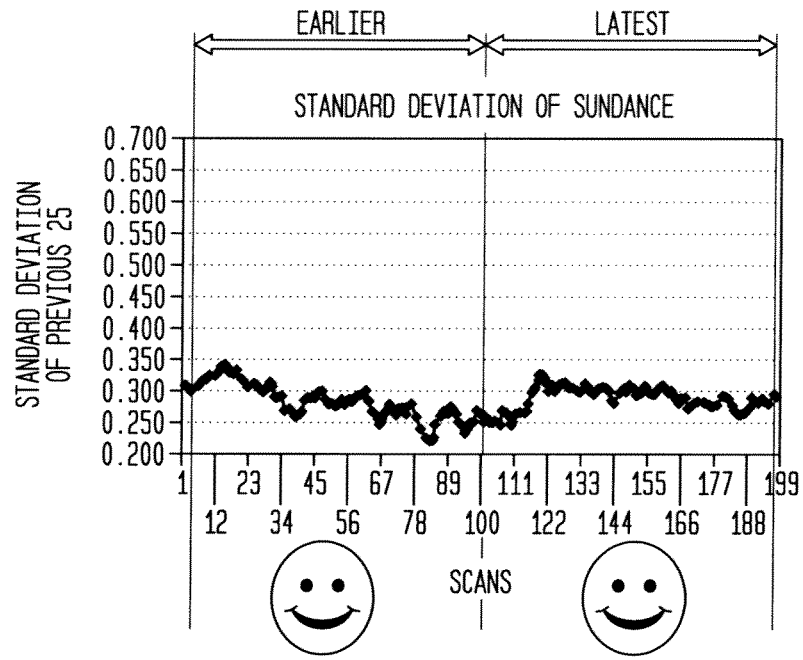
FIG. 11, illustrates an F-Test on Sensor 'A.'

FIG. 11, illustrates an F-Test on Sensor 'A.' One can also do a series of test to determine which sensor is experiencing a failure using an F-test. The hypothesis is that the failing sensor can be detected by a change in the variance of the sample. The technique is to subgroup the sample into groups of, say, 25, and calculate each subgroup's variances. Then compare the variances of the oldest 500 samples with the newest 500 samples. The sensor that is not experiencing change will pass the F-test while the sensor that is experience a change (more variation in its readings) will fail the F-Test. Thus, the first test compares the variance of old A to recent A. And, an F-Test P-value of 0.560(>0.05) indicates that the variances are 'equal'.

Figure 12:
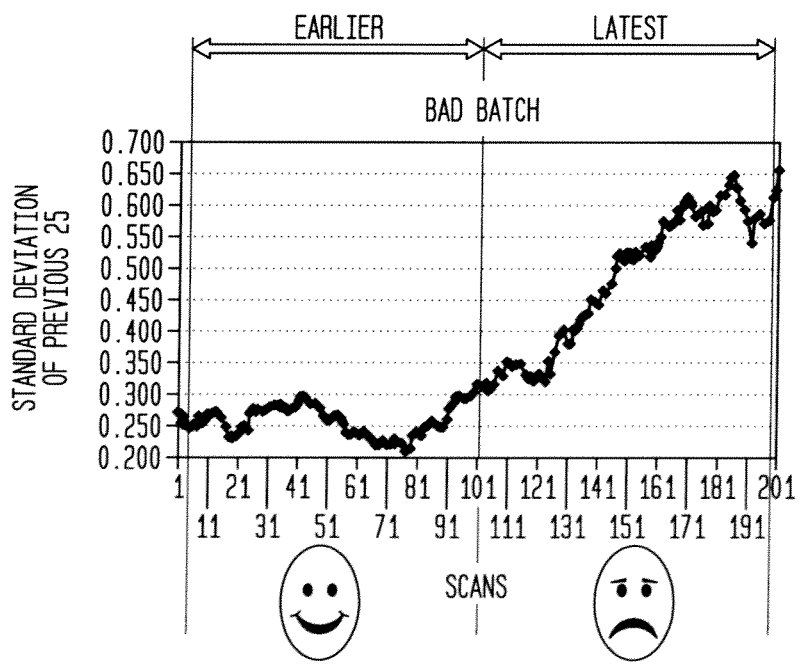
FIG. 12, illustrates an F-Test on Sensor 'B.'

FIG. 12, illustrates an F-Test on Sensor 'B.' The second test compares the variance of old B to recent B. The F-Test P-value of 0.00 (not>0.05) indicates that the variances are 'different.'

Since 'A' does not seem to be changing and 'B' does seem to be changing, one can issue an advisory that declares that 'B' is suspect.

As stated earlier that FDA has been encouraging the use of statistics and other technologies as part of the PAT initiative. This invention has clearly demonstrated that one can dramatically improve the data integrity of the critical instrument signals through redundancy and statistical analysis. In fact, one could argue that if statistical calibration is done in real time then costly periodic manual calibration is no longer necessary.

Furthermore, significant improvements in data integrity will reduce the life cycle cost of the instrumentation and calibration functions and minimize the downside risk of poor quality or lost production caused by faulty instrumentation.

The uniqueness of this invention (1) lies in the calculation and interpretation of the 'deltas' between the pairs of signals and (2) in the use of statistical means to detect a change in performance characteristics of the individual instruments.

The actual statistical tools used herein to demonstrate the invention's viability (namely—statistical control charts and F-test) and the arbitrary selection of sample sizes of 1000 and sub groups of 25 are for illustration and demonstration purposes only. Other academically known statistical tools such as T-test. Paired T-test and the Z-test may be used to increase the statistical confidence level, system robustness and system design optimization.

It goes without saying that the use of statistics to detect drift and the need for instrument calibration has many other applications outside of the pharmaceutical industry. In particular, any two or more devices that need to track performance, such as, propellers, boilers, transformers can be monitored and imbalances detected long before the imbalance damages the equipment.

Another application of this invention is the reduction of instrumentation in a safety system. With the statistics tool able to detect which instrument is failing, a two instrument plus statistical tool configuration will provide the same coverage as a two out of three configuration. Both, a two instrument plus statistical tool configuration and a two out of three instrument configuration will detect a drifting analog value. Neither configuration can absolutely resolve a second failure. In essence, the two plus statistical tool is replacing the third instrument with a software package. Since a software package can be applied to multiple loops and requires less maintenance and energy to operate, there are tremendous life cycle cost savings opportunities.

Figure 13:
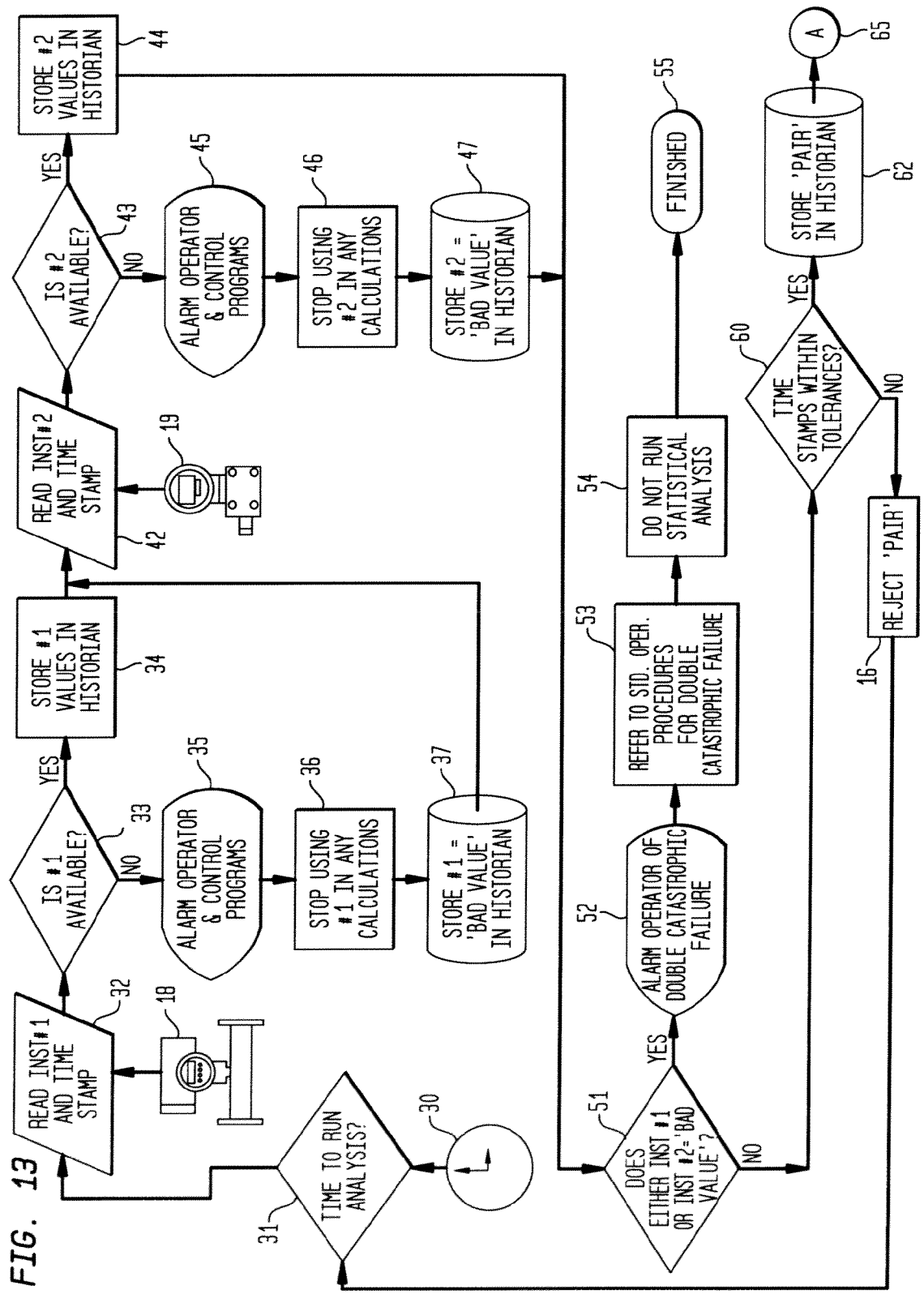
FIG. 13, illustrates a logic flow of an embodiment of the invention with input and data storage processing.

FIG. 13, illustrates a logic flow of an embodiment of the invention with input and data storage processing. At time 30, a time to run analysis 31, is done. A reading is obtained for at least one first remote sensor 18, and it is read and time stamped 32. If the information is available 33, from the first remote sensor 18, then it is stored in a first historian 34. If the information 33, is not available from the first remote sensor 18, then alarm operator and control programs 35, are initiated, and instructions are given to stop using information from the first remote sensor 18, at 36, and a "bad value" is posted in historian at 37, and this information is sent downstream to location 51.

A similarly reading is obtained for at least one second remote sensor 19, and it is read and time stamped 42. If the information is available 43, from the second remote sensor 19, then it is stored in a second historian 44. If the information 43, is not available from the second remote sensor 19, then alarm operator and control programs 45, are initiated, and instructions are given to stop using information from the second remote sensor 19, at 46, and a "bad value" is posted in historian at 47, and this information is sent downstream to location 51.

At location 51, an analysis is done to see if either the first instrument 18, or the second instrument 19, has a "bad value." If the answer is "no" that a "bad value" is not registered at 51, then time stamp within tolerances is checked at 60. If the time stamps are not within tolerances then the "pair" is rejected 61, aid time to ran new analysis at 31, is initiated. However, if the answer is "yes" and the time stamps are within tolerances then the information is stored as a "pair" in historian 62, and sent downstream to 65.

However, if at location 51, the answer is "yes" and it is found that the either the first instrument 18, or the second instrument 19, has a "bad value," then an alarm operator of double catastrophic failure is initiated at 52, one is referred to standard operations procedures for double catastrophic failure at 53, and a do not run statistical analysis is flagged at 54, and the processing is finished at 55.

Figure 14:
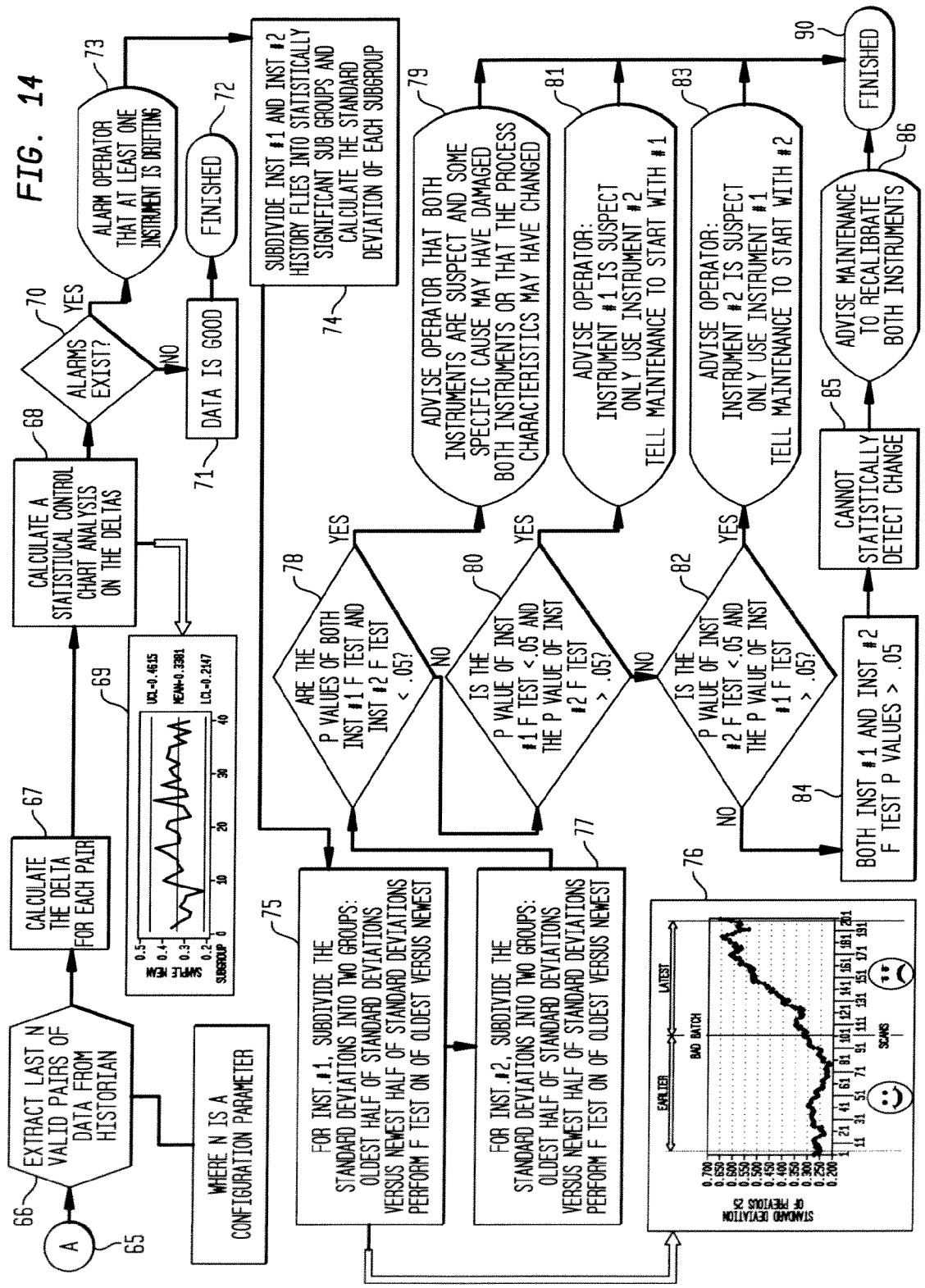
FIG. 14, illustrates a logic flow of an embodiment of the invention with data analysis and alarm processing.

FIG. 14, illustrates a logic flow of an embodiment of the invention with data analysis and alarm processing. The information from historian 62, obtained in FIG. 13, is sent downstream at 65, to a location 66, which extracts last N valid pairs of data from the historian, where N is a configuration parameter. At location 67, one calculates the "Delta" for each pair of information obtained at location 66, and is forwarded for a calculation using statistical control chart analysis on the "Deltas" at 68, which information is obtained from a chart 69. This information is then sent to location 70, to see if any alarms exist. If there are no alarm conditions then the data is good 71, and the processing is completed or finished at 72.

However, if at location 70, it is determined that an alarm condition exists, and the answer is "yes" then an alarm operation is initiated at 73, as at least one of the instrument is drifting, this information is sent to location 74, where it subdivides the information from the first remote sensor 18, and information from the second remote sensor 19, history files into statistically significant sub-groups and then calculates the standard deviation of each sub-group, and this information is sent to location 75.

At location 75, one would for the first instrument 18, subdivide the standard deviations into two groups, such as, for example, a first group of oldest half of standard deviations, and a second group of newest half of standard deviations, and then compare the two, as shown in chart 76, which is similar to the chart shown in reference to FIG. 12. One could then perform a test, such as, an F-Test on the oldest half verses the newest half and send the information to location 78.

Similarly, at location 77, one would for the second instrument 19, subdivide the standard deviations into two groups, such as, for example, a first group of oldest half of standard deviations, and a second group of newest half of standard deviations, and then compare the two, as shown in chart 76, which is similar to the chart shown in reference to FIG. 12. One could then perform a test, such as, an F Test on the oldest half verses the newest half and send the information to location 78.

At location 78, one would look at the P values of both instruments 18 and 19, and see, for example, if the first instrument 18, F-Test, and the second instrument 19, F-Test is, for example, less than 0.05. If the answer is "yes" then one would advise the operator that both instruments are suspect and some "specific cause" may have damaged both instruments or that the process characteristics may have changed at 79, and then the process would be finished at location 90.

However, if at location 78, the answer is "no" then at location 80, a second test would be done to see if the P value of the first instrument 18, F-Test is less than 0.05, and the P value of the second instrument 19, F-Test is greater than 0.05, then if at location 80, the answer is "yes" then at location 81, one would advise the operator that the first instrument 18, is suspect, and that maintenance needs to be started on the first instrument 18, and that to use the readings from the second instrument 19, only, and then the process would be finished at location 90.

If at location 80, the answer is "no" then a third test would be done at location 82, to see if the P value of the second instrument 19, F-Test is less than 0.05, and the P value of the first instrument 18, F-Test is greater than 0.05, then if at location 82, the answer is "yes" then at location 83, one would advise the operator that the second instrument 19, is suspect, and that maintenance needs to be started on the second instrument 19, and that to use the readings from the first instrument 18, only, and then the process would be finished at location 90.

However, if at location 82, the answer is "no" then at location 84, it is validated that both the first instrument 18, and the second instrument 19, F-Test P values is greater than 0.05, and that one cannot statistically detect change at 85, and then at 86, an advisory would be issued that maintenance to re-calibrate both instruments 18 and 19, is needed, and then the process would be finished at location 90.

The following embodiments are further examples of (1) the use of different statistical tools that may be used to analyze the uniquely prepared data, and (2) different system topographies and mechanisms to deliver the calibration alarm message.

Figure 15:
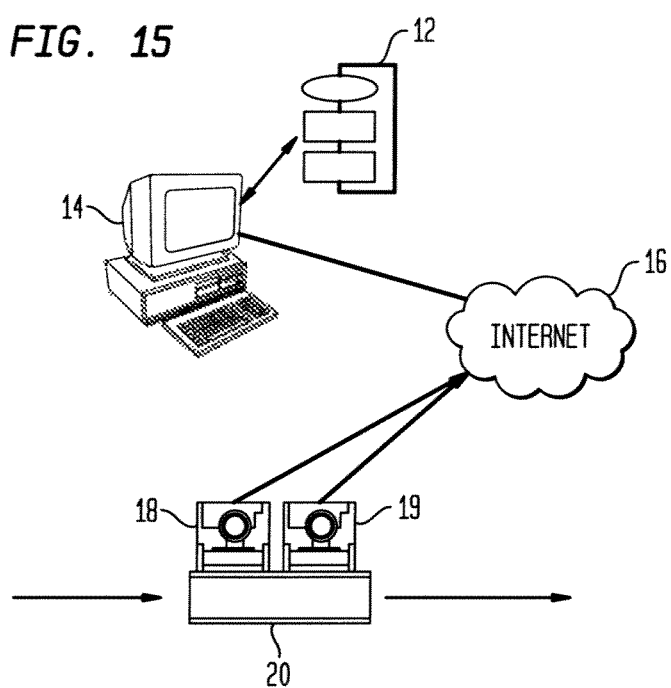
FIG. 15, illustrates a second embodiment of the invention.

FIG. 15, illustrates a second embodiment of the invention which is a remote system for determination of re-calibration of instruments. Shown in FIG. 15, is a schematic diagram of a system which may be used to remotely monitor the performance of remote sensing instruments in accordance with the statistical analysis used to determine whether there is a need for calibration. A remote computer or workstation 14, having a processor and related memory are used to run monitoring and statistical analysis of data received from remote sensing instruments. In the system shown in FIG. 15, statistical monitoring and analysis 12, is run on computer 14, having a communication interface to access the Internet 16, and to communicate with at least one first remote sensor or instrument 18, and at least one second remote sensor or instrument 19. In the present embodiment and as an example only, it is contemplated that the sensing instruments are, for example, acoustic flowmeters 18, 19, used to determine the flow velocity of a fluid in a pipe 20. The acoustic instruments 18, 19, are a different specifies of the same type of instruments, namely, instruments capable of evaluating flow rate as a function of the delay in receipt of an acoustic signal. Flowmeters 18, 19, are externally coupled to pipe 20, externally and in a non-intrusive manner. Within each of the flowmeters 18, 19, signals are generated and received and then stored in the memory of each of the flowmeters 18, 19. On either a polled basis from the remote computer 14, or on a predetermined basis established by the computer 14, or at the remote site by the flowmeters 18, 19, sensed data relating to flow of fluid in the pipe 20, is sent to the computer 14, for processing. The flowmeters 18, 19, may have a built-in interface capable of directly connecting with the Internet 16, or may be configured within a distributed control system which would include an interface processor or separate computer which would acquire the data and forward the data back to the computer 14. As data is received at the computer 14, and while running statistical analysis software 12, in accordance with the methodology disclosed herein, resulting data is processed, and a determination is made as to whether the either of the flowmeters 18, 19, should be re-calibrated.

Operationally, the flowmeters 18, 19 may have access to a website on the Internet 16, provided by the remote monitoring system via a separate server. The designated website for the flowmeters 18, 19, may be particular to the flowmeters or maybe a generic website in which the identity of the flowmeters must first be established in order to properly route the data to the appropriate destination. In one embodiment of the invention, the system may process a myriad of remote sensing instruments from various locations.

In the event that a determination is made that calibration of a sensing instrument is necessary, a notification for calibration may take several forms. In one version of several notification means, an email maybe sent from the monitoring computer 14, as a priority email or a computer generated message to one or more email or similar other destination. Alternatively, and depending on the sophistication of the acoustic flowmeters, a response message may be sent directly to, either a control processor in a distributed control system (DCS) for forwarding and routing of the calibration notification, or directly to the flowmeters, where based on the design, an alarm, such as, an audible sound and/or a visual display of a "calibration light" or LCD display may be sounded or shown to depict the need for calibration. The details of the statistical calculations have already been discussed earlier.

Figure 16:
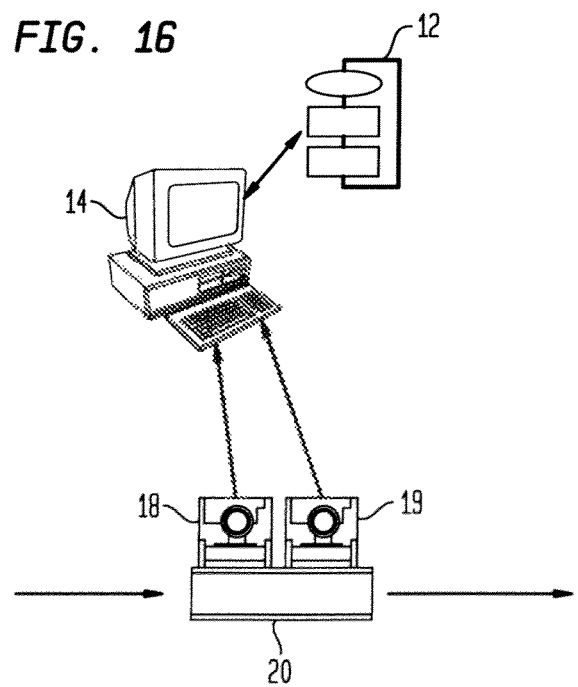
FIG. 16, illustrates a third embodiment of the invention.

FIG. 16, illustrates a third embodiment of the invention which shows the use of multiple statistical tests to determine need for calibration. Shown in FIG. 16, is a schematic diagram of a system which may be used to remotely monitor the performance of remote sensing instruments in accordance with the statistical analysis used to determine whether there is a need for calibration. A computer or workstation 14, having a processor and related memory are used to run monitoring and statistical analysis of data received from sensing instruments.

In the system shown in FIG. 16, statistical monitoring and analysis software 12, is ran on computer 14, having a communication interface to communicate with the sensors or sensing instruments 18, 19. In this third present embodiment and as an example only, it is contemplated that the sensing instruments 18, 19, are acoustic flowmeters 18, 19, used to determine the flow velocity of a fluid in pipe 20. The acoustic instruments 18, 19, are a different specifies of the same type of instruments, namely instruments capable of evaluating flow rate as a function of die delay in receipt of an acoustic signal. Flowmeters 18, 19, are externally coupled to pipe 20, externally and in a non-intrusive manner. Within each of the flowmeters 18, 19, signals are generated and received and then stored in the memory of each of the flowmeters 18, 19. On either a polled basis from the remote computer 14, or on a pre-determined basis established by the computer 14, sensed data relating to flow of fluid in the pipe 20, is sent to the computer 14, for processing. As data is received at the computer 14, and while running statistical analysis software 12, in accordance with the methodology disclosed herein, resulting data is processed and a determination is made as to whether the either of the flowmeters should be re-calibrated.

In order to determine whether re-calibration is necessary, a multi-test approach may be taken. As contemplated, the use of multiple tests, such as, F-test, the Z-test, T-test, the Paired T-test, the approach taken by Dan Collins in his paper "Reduce Calibration Costs and Improved Sensor Integrity through Redundancy and Statistical Analysis in a Validated Environment" 2007, may be used in combination of 2 or 3 tests and in whatever order desired. However, in the third embodiment the T-test was first used to determine the significance of a change in the mean of the two readings obtained from the two instruments/sensors. The process of conducting a T-test is described elsewhere within this specification as "The T-Test." Once a determination is made that the two sets of data, one from sensor 18, and the other from sensor 19, are statistically different from each other, the Z-test may be employed to determine which of the two sensors requires calibration.

As an alternative a T-test may be used to determine the significance of an change in the mean of the two readings obtained from the two instruments. The obtained readings are from two different species of instruments sensing the same parameter. The sensed data is historized. And then the data is periodically converted to a value suitable for evaluation by a T-test. The T-test will determine whether there is a statistical difference between the readings (mean readings) from the two instruments so as to determine whether re-calibration is advisable. A brief look at the use of the T-test is discussed herein. A combination of multiple statistical tests is also contemplated as well as using historical data to determine which test algorithm should be used.

The T-Test assesses whether the means of two groups are statistically different from each other. This analysis is appropriate whenever one wants to compare the means of two data groups, and especially appropriate as the analysis for the posttest-only two-group randomized experimental design.

Figure 17:
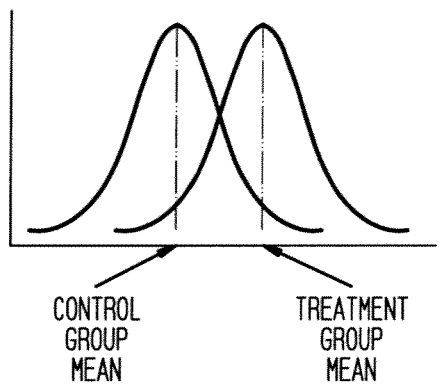
FIG. 17, illustrates an idealized distributions for treated and comparison group posttest values.

FIG. 17, illustrates an idealized distributions for treated and comparison group posttest values. FIG. 17, shows the distributions for the treated (right curve) and the control (left curve) groups in a study, and which can also be applied to a first instrument reading and a second instrument reading. Actually, FIG. 17, shows the idealized distribution, the actual distribution would usually be depicted with a histogram or bar graph. The figure indicates where the first instrument and the second instrument means are located, using the first instrument data as the "control group," and the second instrument data as the "treatment group." The question the T-test addresses is whether the means are statistically different.

Figure 18A:
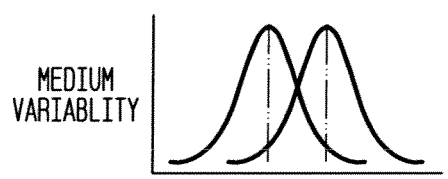
FIGS. 18A, 18B, and 18C, illustrates three scenarios for differences between means.
Figure 18B:
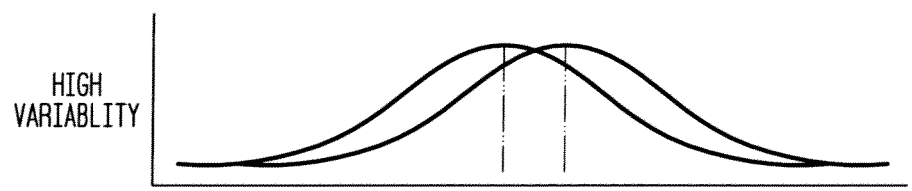
Figure 18C:
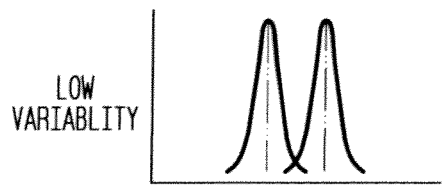

FIGS. 18A, 18B, and 18C, illustrates three scenarios for differences between means. In order to better understand that the averages for two groups are statistically different one should consider the three situations shown in FIGS. 18A, 18B, and 18C. The first thing to notice about the three situations is mat the difference between the means is the same in all three, but, one will notice that the three situations do not look the same. The top example (FIG. 18A) shows a case with moderate or medium variability of scores within each data group. The middle example (FIG. 18B) shows the high variability case, while die bottom example (FIG. 18C) shows the case with low variability. Clearly, one would conclude that the two data groups appear most different or distinct in the bottom or low-variability case, as there is relatively little overlap between the two bell-shaped curves. In the high variability case, the group data difference appears least striking because the two bell-shaped distributions overlap so much. This leads one to a conclusion that when one is looking at the differences between values of two data groups, one has to judge the difference between their means relative to the spread or variability of their scores. The T-test provides similar results.

In light of the high frequency and high cost of performing calibrations in a validated environment and the down side risk and cost of a quality issues, the potential savings can be huge. Therefore, the life cycle cost can warrant the increased initial investment in a second instrument and the real time statistical analysis of the instrument pair, as discussed and disclosed in this invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method of using statistics to determine calibration of instruments, comprising:
   (a) sensing at least one critical value in a process flow by a first sensing instrument;
   (b) sensing the at least one critical value in the process flow by a second sensing instrument, wherein the first sensing instrument is a different type of sensing instrument than the second sensing instrument;
   (c) tracking relative consistency of a first set of data obtained from said first sensing instrument and a second set of data obtained from said second sensing instrument to detect a drift representing changes in mean differences between the first set of data and the second set of data occurring over a period of time; and
   (d) in response to detecting the drift, determining which instrument of the first sensing instrument and the second sensing instrument is a cause of the drift by identifying a change in a standard deviation in at least one of the first set of data and the second set of data.

2. The method of using statistics to determine calibration of instruments of claim 1, wherein determining which instrument of the first sensing instrument and the second sensing instrument is the cause of the drift comprises:
   using at least one process alarm management system to alarm an operator that at least one of said first sensing instrument and said second sensing instrument is statistically drifting apart.

3. The method of using statistics to determine calibration of instruments of claim 1, wherein tracking relative consistency of the first set of data and the second set of data comprises:
   tracking relative consistency of the first set of data and the second set of data using at least one first statistical control chart.

4. The method of using statistics to determine calibration of instruments of claim 1, wherein tracking relative consistency of the first set of data and the second set of data comprises:
   tracking relative consistency of the first set of data and the second set of data using at least one first statistical control chart at least one first statistical control chart, and wherein said at least one first statistical control chart is developed using a first set of historical data from said first instrument and a second set of historical data from said second instrument.

5. The method of using statistics to determine calibration of instruments of claim 1, wherein determining which instrument of the first sensing instrument and the second sensing instrument is the cause of the drift comprises:
   determining which instrument of the first sensing instrument and the second sensing instrument is the cause of the drift based on a statistical analysis of said change in standard deviation of at least one of the first set of data and the second set of data.

6. The method of using statistics to determine calibration of instruments of claim 1, wherein determining which instrument of the first sensing instrument and the second sensing instrument is the cause of the drift comprises:
   performing at least one test to determine said change in standard deviation of at least one of the first set of data and the second set of data.

7. The method of using statistics to determine calibration of instruments of claim 1, wherein determining which instrument of the first sensing instrument and the second sensing instrument is the cause of the drift comprises:
   performing at least one test is done to determine said change in standard deviation of at least one of the first set of data and the second set of data, and wherein said at least one test is selected from a group consisting of a F-Test, a T-Test, a T-Paired Test, a Z-Test, and combination thereof.

8. The method of using statistics to determine calibration of instruments of claim 1, wherein determining which instrument of the first sensing instrument and the second sensing instrument is the cause of the drift comprises:
   dividing the first set of data into a first plurality of sub-groups;
   dividing the second set of data into a second plurality of sub-groups;

comparing data from each respective sub-group in the first plurality of sub-groups against each other sub-group in the first plurality of sub-groups to determine a change in standard deviation of the first set of data; and
comparing data from each respective sub-group in the second plurality of sub-groups against each other sub-group in the second plurality of sub-groups to determine a change in standard deviation of the second set of data.

9. The method of using statistics to determine calibration of instruments of claim 1, wherein determining which instrument of the first sensing instrument and the second sensing instrument is the cause of the drift comprises:
dividing the first set of data into a first plurality of half groups;
dividing the second set of data into a second plurality of half groups;
comparing data from each respective half group in the first plurality of sub-groups against each other half group in the first plurality of half groups to determine a change in standard deviation of the first set of data; and
comparing data from each respective half group in the second plurality of half groups against each other half group in the second plurality of half groups to determine a change in standard deviation of the second set of data.

10. The method of using statistics to determine calibration of instruments of claim 1, wherein determining which instrument of the first sensing instrument and the second sensing instrument is the cause of the drift comprises:
dividing the first set of data into a first newest group and a first oldest group;
dividing the second set of data into a second newest group and a second oldest group;
comparing data from the first newest group and the first oldest group to determine a change in standard deviation of the first set of data; and
comparing data from the second newest group and the second oldest group to determine a change in standard deviation of the second set of data.

11. A method of using statistics to determine calibration of instruments, comprising:
(a) sensing at least one critical value in a process flow by a first sensing instrument;
(b) sensing the at least one critical value in the process flow by a second sensing instrument, wherein the first sensing instrument is a different type of sensing instrument than the second sensing instrument;
(c) obtaining first tracking information from said first sensing instrument, and obtaining second tracking information from said second sensing instrument:
(d) sending said first tracking information and said second tracking information to a computer;
(e) tracking in said computer relative consistency of the first tracking information and the second tracking information to detect a drift representing changes in mean differences between said first tracking information and said second tracking information occurring over a period of time; and
(f) in response to detecting the drift, determining which instrument of the first sensing instrument and the second sensing instrument is a cause of the drift by identifying a change in a standard deviation of at least one of the first tracking information and the second tracking information.

12. The method of using statistics to determine calibration of instruments of claim 11, determining which instrument of the first sensing instrument and the second sensing instrument is the cause of the drift comprises:
using at least one process alarm management system to alarm an operator that at least one of said first sensing instrument and said second sensing instrument is statistically drifting apart.

13. The method of using statistics to determine calibration of instruments of claim 11, wherein tracking relative consistency of the first tracking information and the second tracking information comprises:
tracking relative consistency of the first tracking information and the second tracking information using at least one first statistical control chart.

14. The method of using statistics to determine calibration of instruments of claim 11, wherein tracking relative consistency of the first tracking information and the second tracking information comprises:
tracking relative consistency of the first tracking information and the second tracking information using at least one first statistical control chart at least one first statistical control chart, and wherein said at least one first statistical control chart is developed using first historical tracking information from said first instrument and second historical tracking information said second instrument.

15. The method of using statistics to determine calibration of instruments of claim 11, wherein determining which instrument of the first sensing instrument and the second sensing instrument is the cause of the drift comprises:
determining which instrument of the first sensing instrument and the second sensing instrument is the cause of the drift based on a statistical analysis of said change in standard deviation of at least one of the first tracking information and the second tracking information.

16. The method of using statistics to determine calibration of instruments of claim 11, wherein determining which instrument of the first sensing instrument and the second sensing instrument is the cause of the drift comprises:
performing at least one test to determine said change in standard deviation of at least one of the first tracking information and the second tracking information.

17. The method of using statistics to determine calibration of instruments of claim 11, wherein determining which instrument of the first sensing instrument and the second sensing instrument is the cause of the drift comprises:
performing at least one test is done to determine said change in standard deviation of at least one of the first tracking information and the second tracking information, and wherein said at least one test is selected from a group consisting of a F-Test, a T-Test, a T-Paired Test, a Z-Test, and combination thereof.

18. The method of using statistics to determine calibration of instruments of claim 11, wherein determining which instrument of the first sensing instrument and the second sensing instrument is the cause of the drift comprises:
dividing the first tracking information into a first plurality of sub-groups;
dividing the second tracking information into a second plurality of sub-groups;
comparing information from each respective sub-group in the first plurality of sub-groups against each other sub-group in the first plurality of sub-groups to determine a change in standard deviation of the first tracking information; and
comparing information from each respective sub-group in the second plurality of sub-groups against each other sub-group in the second plurality of sub-groups to determine a change in standard deviation of the second tracking information.

19. The method of using statistics to determine calibration of instruments of claim 11, wherein determining which instrument of the first sensing instrument and the second sensing instrument is the cause of the drift comprises:
- dividing the first tracking information into a first plurality of half groups;
- dividing the second tracking information into a second plurality of half groups;
- comparing information from each respective half group in the first plurality of sub-groups against each other half group in the first plurality of half groups to determine a change in standard deviation of the first tracking information; and
- comparing information from each respective half group in the second plurality of half groups against each other half group in the second plurality of half groups to determine a change in standard deviation of the second tracking information.

20. The method of using statistics to determine calibration of instruments of claim 11, wherein determining which instrument of the first sensing instrument and the second sensing instrument is the cause of the drift comprises:
- dividing the first tracking information into a first newest group and a first oldest group;
- dividing the second tracking information into a second newest group and a second oldest group;
- comparing information from the first newest group and the first oldest group to determine a change in standard deviation of the first tracking information and
- comparing information from the second newest group and the second oldest group to determine a change in standard deviation of the second tracking information.

21. The method of using statistics to determine calibration of instruments of claim 11, wherein sending said first tracking information and said second tracking information to the computer comprises:
- sending said first tracking information and said second tracking information via Internet.

22. The method of using statistics to determine calibration of instruments of claim 11, wherein sending said first tracking information and said second tracking information to the computer comprises:
- sending said first tracking information and said second tracking information via electronic media, and wherein said electronic media is selected from a group consisting of an Internet, an Email, a Website, a PDA, and combinations thereof.

23. A non-transitory program storage device readable by machine, tangibly embodying a program of instructions executable by the machine to perform method steps for using statistics to determine calibration of instruments, the method steps comprising:
- (a) sensing at least one critical value in a process flow by a first sensing instrument;
- (b) sensing the at least one critical value in the process flow by a second sensing instrument, wherein the first sensing instrument is a different type of sensing instrument than the second sensing instrument;
- (c) tracking relative consistency of a first set of data obtained from said first sensing instrument and a second set of data obtained from said second sensing instrument to detect a drift representing changes in mean differences between the first set of data and the second set of data occurring over a period of time; and
- (d) in response to detecting the drift, determining which instrument of the first sensing instrument and the second sensing instrument is a cause of the drift by identifying a change in a standard deviation in at least one of the first set of data and the second set of data.

24. A non-transitory program storage device readable by machine, tangibly embodying a program of instructions executable by the machine to perform method steps for using statistics to determine calibration of instruments, the method steps comprising:
- (a) sensing at least one critical value in a process flow by a first sensing instrument;
- (b) sensing the at least one critical value in the process flow by a second sensing instrument, wherein the first sensing instrument is a different type of sensing instrument than the second sensing instrument;
- (c) obtaining first tracking information from said first sensing instrument, and obtaining second tracking information from said second sensing instrument:
- (d) sending said first tracking information and said second tracking information to a computer;
- (e) tracking in said computer relative consistency of the first tracking information and the second tracking information to detect a drift representing changes in mean differences between the first tracking information and the tracking information occurring over a period of time; and
- (f) in response to detecting the drift, determining which instrument of the first sensing instrument and the second sensing instrument is a cause of the drift by identifying a change in a standard deviation of at least one of the first tracking information and the second tracking information.

* * * * *